Aug. 21, 1945.  W. C. EATON ET AL  2,382,980
OPHTHALMIC MOUNTING
Filed March 17, 1941
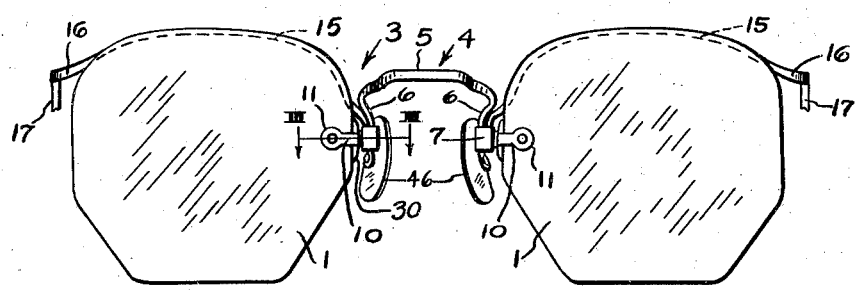
Fig. I
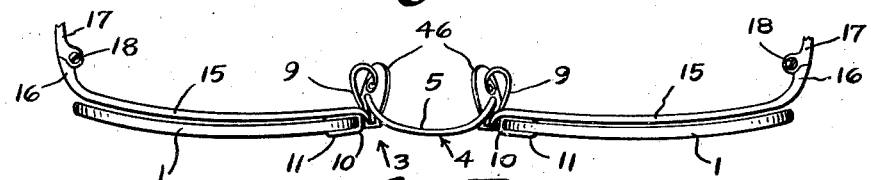
Fig. II
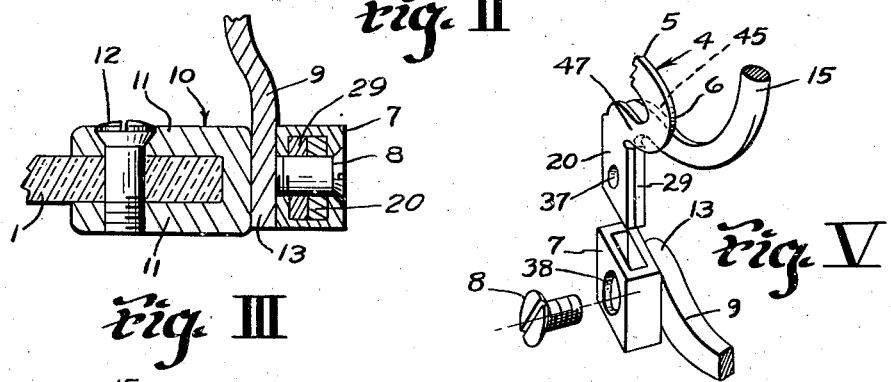
Fig. III
Fig. V
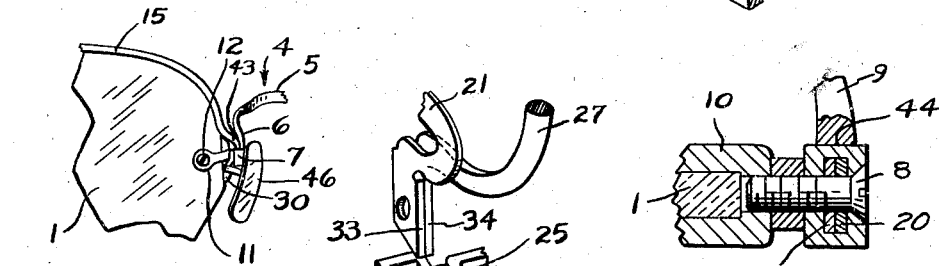
Fig. IV
Fig. VII
Fig. VI
INVENTOR
WILLIAM C. EATON
WILBUR LEDUC
BY
Louis L. Gagnon
ATTORNEY Patented Aug. 21, 1945

2,382,980

UNITED STATES PATENT OFFICE 2,382,980

OPHTHALMIC MOUNTING

William C. Eaton and Wilbur Leduc, Southbridge, Mass., assignors to American Optical Company, Southbridge, Mass., a voluntary association of Massachusetts Application March 17, 1941, Serial No. 383,750

6 Claims. (Cl. 88—41)

This invention relates to improvements in ophthalmic mountings and has particular reference to that type of mounting wherein the parts may be formed to various standard sizes and be interchangeable.

One of the principal objects of the invention is to provide a construction of ophthalmic mounting having relatively long and slender temple supports shaped to follow the upper contour edges of the lenses with detachable parts which may be made to standard graded sizes to suit the requirements of different individuals whereby different assemblies may be formed to meet the requirements of said individuals.

Another object is to provide, in a construction of the above character, long and slender temple supports of varying lengths for use with lenses of the standard graded sizes in the ophthalmic art whereby an arm of proper length for the particular lens may be selected and may be detachably secured to the supporting part of the mounting.

Another object is to provide a construction of mounting of the above character with interchangeable bridge members, nose pad supporting arms and long and slender temple supports.

Other objects and advantages of the invention will become apparent from the following description taken in connection with the accompanying drawing and it will be apparent that many changes may be made in the details of construction and arrangement of parts without departing from the spirit of the invention as expressed in the accompanying claims. The invention, therefore, is not to be limited to the exact details of construction and arrangement of parts as the preferred forms only have been given by way of illustration.

Referring to the drawing:

Fig. I is a front elevation of an ophthalmic mounting embodying the invention;

Fig. II is a top plan view of the mounting illustrated in Fig. I;

Fig. III is an enlarged fragmentary sectional view taken as on line III—III of Fig. I and looking in the direction indicated by the arrows;

Fig. IV is a partial rear elevation of the ophthalmic mounting shown in Fig. I;

Fig. V is an enlarged fragmentary view showing the parts of the mounting illustrated in disassociated relation with each other;

Fig. VI is an enlarged fragmentary sectional view generally similar to Fig. III showing a modification of the invention; and Fig. VII is an enlarged fragmentary view of a further modification showing the parts of the mounting illustrated in disassociated relation with each other.

The invention, in this particular instance, relates to the provision of an ophthalmic mounting of the type having long and slender temple supports shaped to follow substantially the upper contour shape of the lenses wherein some of the parts of the supporting structure of the mounting are supplied to the opticians or mounting dispensers in graded standard sizes, whereby an assembly of parts of sizes suitable for a particular individual may be selected and assembled to complete the mounting and relates particularly to the provision of long and slender temple supports in standard graded sizes suitable for assembly with lenses of the standard graded sizes known in the art whereby a temple support suitable to fit a particular lens may be selected and be detachably connected with the supporting structure.

Referring more particularly to the drawing wherein like characters of reference designate like parts throughout the several views, one of the ophthalmic mountings embodying the invention, as illustrated in Figs. I to V, comprises a pair of lenses 1 carried by a supporting structure 3 embodying a bridge member 4. The said bridge member comprises a central arch portion 5 which may be formed rigid or resilient or may have portions thereof formed to one or both of said characteristics. The bridge member, in this particular instance, comprises depending side portions 6 constituting portions looped and turned forwardly at 47 and thence downwardly and terminating in perforated ends 20 shaped to fit within stud boxes 7 and be secured therein by suitable connecting means 8. In this particular construction the stud boxes 7 are secured to the forward ends 13 of the adjustable nose pad supporting arms 9 which are in turn secured to lens straps 10.

The forward ends of the adjustable nose pad supporting arms 9, in addition to forming joining means for the stud boxes 7 and the lens straps 10, also function as spacer means for controlling the resultant distance between the lens straps 10 in the completed mounting. The lens straps 10 are provided with portions 11 shaped to overlie the front and rear surfaces of the lenses and are joined thereto by suitable connecting screws or the like 12.

It is to be understood that although the lens straps are provided with spacer ears 11 shaped to overlie both the front and rear surfaces of the lenses the said straps may be provided with only one ear, in which instance the said ear will overlie only one side surface of the lens.

The supporting structure 3 further comprises a pair of long and slender temple supports 15 which, as shown in Figs. I to V are secured adjacent the nasal end thereof within the stud boxes 7. The temple supports 15 are shaped to follow the upper contour shape of the lenses throughout the major portion of the length thereof and terminate in outwardly and rearwardly curving adjustable temple supporting ends 16. The temple supporting ends 16 are adapted to support suitable temples 17 which are pivotally attached to the supporting ends 16 as illustrated at 18.

The relatively long and slender temple supports 15 may be formed resilient, pliable or rigid as desired or may have portions thereof with one or more of said characteristics. It is also pointed out that said long and slender temple supports 15 may be shaped to follow the upper contour edges of the lenses, in the rear of the plane of said lens edges or in the front thereof as desired; it being preferable, however, to locate said long and slender temple supports in the rear of the plane of said temple edges and in slightly spaced relation therewith.

In Fig. VII there is illustrated a slight modification which comprises broadly a stud box 19 shaped to receive the detachable end 33 of a bridge member 21 simulating the bridge 4, the detachable end 34 of the temple support 27, and the detachable end 22 of the nose pad supporting arm 23. In this construction all of the detachable ends of the bridge member 21 temple supports 27 and nose pad supporting arms 23 are provided with aligned perforations through which a suitable connecting screw or other securing means 24 is extended. It is to be understood, of course, that the stud box 19 is provided with suitable connection openings to receive the connecting means 24, and in instances wherein the said connecting means 24 is in the form of a screw member, as illustrated in Fig. VII, the parts of the assembly are provided with an internally threaded opening in which the connecting screw 24 is threadedly attached. The stud box 19 is secured to the edge portion 25 of the lens strap through an intermediate spacer member 26. It is to be understood that the various permanently connected parts may be joined by soldering, welding or the like throughout the contiguous surfaces thereof. In Figs. I to V the lens strap 10 is of the commonly known rigidly attached type having an adjustable shoe 30 adapted to be fitted in intimate relation with the adjacent edge of the lens with the said strap being rigidly attached to the lens by a screw or other suitable connecting means 12. In this construction, therefore, both the bridge and temple supporting arms are detachably supported. It is to be understood that the attached ends 20 and 29 respectively of the bridge and temple supporting arm are so shaped as to have a relatively snug and intimate fit with the internal walls of the stud boxes 7 so as to obviate looseness and play therein and so that they will be rigidly held in assembled relation with the remaining parts of the supporting structure of the mounting by connecting means 8.

The ends 20 and 29 of the bridge and temple supports shown in Fig. V are provided with perforations 37 which are adapted to be aligned with a perforation 38 in the side wall of the stud box 7 and are secured in said stud box by a screw or other suitable connecting means 8. In this instance, the adjustable nose pad supporting arms 9 are provided with forward ends 13 which are secured intermediate the stud boxes 7 and the adjacent edge portion of the lens straps 10.

Although the forward ends 13 of the adjustable nose pad supporting arms 9 are shown as being permanently attached intermediate the stud boxes 7 and the edge portions of the straps 10 by soldering, welding or the like it is to be understood that they may be shaped and provided with a perforated end as shown at 22 in Fig. VII to be received within the stud box 19 in adjacent aligned relation with the attaching ends 33 and 34 of the temple supports and bridge member and held therein by the connecting means 24.

With the construction illustrated in Figs. I to V it is intended to provide a plurality of standardized temple supports 15 which are graded in lengths to fit the respective standard graded sizes of the upper contour edges of ophthalmic lenses. These sizes are commercially known as 38, 40, 42, 44 and 46 mm. lenses which constitute a known commercial series of lenses. The said lenses, however, may possess different contour shapes although formed to similar sizes as the lenses of the series set forth above. It is preferable, however, that each of the lenses of the series be formed with an upper contour edge of a standardized size and shape extending from the attaching point of the lens straps to the outer upper temporal edge of the lens and in instances when lenses of different contour shapes are desired to form the lower contour portions of the lenses to said different shapes. With such an arrangement it is possible to provide long and slender temple supports graded in sizes according to the respective sizes of the lenses of the series and preshaped to the shape of the upper contour edges of the respective lenses. With this construction there is greater ease in assembling the parts and adjusting them to desired relation with each other. The temple supports in this instance may be formed rigid, pliable or resilient, as desired, or may have different portions thereof possessing one or more of said characteristics.

As shown in Fig. IV it is to be noted that the long and slender temple supports 15 are shaped throughout the major portion of their length to follow the upper contour shape of the lenses. As the said temple supports approach the nasal end thereof they are deflected outwardly, as illustrated at 43, and thence turn forwardly at 45 and downwardly to the attaching end 29. The cross-sectional shape of the long and slender temple supports 15 throughout the major portion of their length may be round or oval, as illustrated in Fig. V, but are reduced as they approach the nasal end thereof to a substantially rectangular cross-sectional shape which is dimensioned so as to have a relatively intimate fit internally of the stud box 7. This is also true of the attaching ends 20 of the bridge member 4. In the above construction suitable nose pads 46 are either rigidly or pivotally supported by the nose pad supporting arms with the major portion of the lengths of said arms being adjustable so as to fit the pads to the sides of the nose.

As an alternate construction the nose pad supporting arms 9 may be secured to the rear side surface of the stud box, as illustrated at 44 in Fig. VI and extend directly rearwardly from said stud boxes.

The various bridge members set forth above may be provided with a rigid central arch portion and rigid depending side portions or the central arch portion may be formed resilient and the depending side portions rigid.

From the foregoing description it will be seen that simple, efficient and economical means have been provided for accomplishing all of the objects and advantages of the invention.

Having described our invention, we claim:

1. A lens supporting structure for the lenses of an ophthalmic mounting comprising a pair of lens holding members each having a stud box carried thereby, bridge means for supporting said lens holding members in spaced relation with each other, nose pad supporting means extending rearwardly of said lens holding means and long and slender temple supports shaped substantially to follow the upper contour shape of the lenses and having a portion extending downwardly and following substantially the shape of the lenses on the nasal sides thereof to a point adjacent the stud boxes when assembled with said lenses and thence turning outwardly adjacent said point in a direction away from the adjacent contour edge of the lens and thence turning forwardly and downwardly to an attachment portion shaped to fit within the stud box, said bridge means having side portions turning forwardly and downwardly to an attachment portion shaped to fit within the stud box with said attachment portions being similar in shape to and following the adjacent attachment portions of the long and slender temple supports and means for detachably securing said attachment portions in said stud box, said forwardly and downwardly extending portions of the temple supports being located adjacent to and following substantially the shape of the forwardly and downwardly extending portions of the bridge between said bridge and the lens holding means.

2. A lens supporting structure for the lenses of an ophthalmic mounting comprising a pair of lens holding members each having a stud box carried thereby, bridge means having a central arch portion and depending sides constituting portions extending forwardly and downwardly to attachment portions adapted to fit within the stud boxes, nose pad supporting means secured to the stud boxes and extending rearwardly of said lens holding means and long and slender temple supports shaped substantially to follow the upper contour shape of the lenses and having a portion extending downwardly and following substantially the shape of the lenses on the nasal sides thereof to a point adjacent the stud box when assembled with said lenses and thence having a portion turning outwardly adjacent said point in a direction away from the adjacent contour edge of the lens and thence turning forwardly and downwardly adjacent to and following substantially the forwardly and downwardly extending portions of the bridge to an attachment portion shaped to lie in side surface contact with the attachment portion of the bridge internally of the stud box and means for detachably securing said attachment portions in said stud box, said forwardly and downwardly extending portions of the temple supports being positioned to lie between the side portions of the bridge and the lens holding means.

3. A lens supporting structure for the lenses of an ophthalmic mounting comprising a pair of lens holding members each having a stud box carried thereby, bridge means for supporting said lens holding members in spaced relation with each other, nose pad supporting means extending rearwardly of said lens holding means and long and slender temple supports shaped substantially to follow the upper contour shape of the lenses and having a portion extending downwardly and following substantially the shape of the lenses on the nasal sides thereof to a point adjacent the stud boxes when assembled with said lenses and thence turning outwardly adjacent said point in a direction away from the adjacent contour edge of the lens and thence turning forwardly and downwardly to an attachment portion shaped to fit within the stud box, said bridge means having side portions turning forwardly and downwardly to an attachment portion shaped to fit within the stud box with said forwardly and downwardly extending portions being similar in shape to and following the adjacent forwardly and downwardly extending portions of the long and slender temple supports, said nose pad supporting means having an attachment end portion shaped to fit within the stud box in side surface relation with the adjacent ends of the attachment portions of the bridge and temple support and means for detachably securing said attachment portions in said stud box, said forwardly and downwardly extending portions of the temple supports being positioned between and in adjacent relation with the side portions of the bridge and the lens holding means.

4. An ophthalmic mounting comprising a pair of lenses and a lens supporting structure for said lenses, said lens supporting structure comprising a pair of lens holding members each having a stud box carried thereby, bridge means for supporting said lens holding members in spaced relation with each other, nose pad supporting means extending rearwardly of said lens holding means and long and slender temple supports shaped substantially to follow the upper contour shape of the lenses and having a portion extending downwardly and following substantially the shape of the lenses on the nasal sides thereof to a point adjacent the stud boxes and thence turning outwardly adjacent said point in a direction away from the adjacent contour edge of the lens and thence turning forwardly and downwardly to an attachment portion shaped to fit within the stud box, said bridge means having side portions turning forwardly and downwardly to an attachment portion shaped to fit within the stud box with said attachment portions being similar in shape to and following the adjacent attachment portions of the long and slender temple supports and means for detachably securing said attachment portions in said stud box, said forwardly and downwardly extending portions of the temple supports being located adjacent to and following substantially the shape of the forwardly and downwardly extending portions of the bridge between said bridge and the lens holding means.

5. A lens supporting structure for the lenses of an ophthalmic mounting comprising a pair of lens holding members, a pair of stud boxes, a guard arm having a portion secured to and lying between a respective lens holding member and stud box and having a portion extending rearwardly of said stud box, bridge means having a central portion and depending sides constituting portions looping forwardly and thence extending downwardly substantially in a vertical direction and terminating in attachment portions adapted to fit within the stud boxes and long and slender temple supports shaped substantially to follow the upper contour shape of the lenses and having a portion extending downwardly and following substantially the shape of the lenses on the nasal sides thereof to a point adjacent the stud box when assembled with said lenses and thence having a portion turning outwardly adjacent said point in a direction away from the adjacent contour edge of the lens and thence turning forwardly and downwardly adjacent to and following substantially the forwardly and downwardly extending portion of the bridge to an attachment portion shaped to lie in side surface relation with the attachment portion of the bridge internally of the stud box and means for detachably securing said attachment portions in said stud box, said forwardly and downwardly extending portions of the temple supports being positioned to lie between and in adjacent relation with the side portions of the bridge and the lens holding means.

6. A lens supporting structure for the lenses of an ophthalmic mounting comprising a pair of lens holding members, a pair of stud boxes, a guard arm having a portion secured to the lens supporting structure with a side surface thereof engaging a side surface of the stud box and with the remainder thereof extending rearwardly of said stud box, bridge means having a central portion and depending side portions terminating in attachment portions adapted to fit within the stud boxes and long and slender temple supports shaped substantially to follow the upper contour shape of the lenses and each having a portion extending downwardly and following substantially the shape of the adjacent edge of the lens on the nasal side thereof to a point adjacent the stud box when assembled with said lenses and thence having a portion turning outwardly adjacent said point in a direction away from the adjacent contour edge of the lens and thence turning forwardly and downwardly to an attachment portion shaped to lie in side surface relation with the attachment portion of the bridge internally of the stud box and means for detachably securing said attachment portions in said stud box.

WILLIAM C. EATON.
WILBUR LEDUC.